United States Patent [19]
Fisli

[11] Patent Number: 5,563,647
[45] Date of Patent: Oct. 8, 1996

[54] METHOD AND APPARATUS FOR REDUCING DIFFERENCES IN IMAGE HEIGHTS OF IMAGES GENERATED BY PLURAL LIGHT BEAMS HAVING DISSIMILAR WAVELENGTHS

[75] Inventor: Tibor Fisli, Los Altos Hills, Calif.

[73] Assignee: Xerox Corporation, Stamford, Conn.

[21] Appl. No.: 327,873

[22] Filed: Oct. 24, 1994

[51] Int. Cl.$^6$ .................................. B41J 2/47; B41J 2/435
[52] U.S. Cl. .................................. 347/232; 347/239
[58] Field of Search .................................. 347/232, 256, 347/238

[56] References Cited

U.S. PATENT DOCUMENTS

| | | |
|---|---|---|
| 2,885,924 | 5/1959 | Cahen . |
| 4,474,422 | 10/1984 | Kitamura . |
| 4,847,642 | 7/1989 | Murayama . |
| 4,903,067 | 2/1990 | Murayama . |
| 5,157,533 | 10/1992 | Hanamoto . |
| 5,179,462 | 1/1993 | Kageyama et al. . |
| 5,243,359 | 9/1993 | Fisli . |
| 5,276,463 | 1/1994 | Andrews .................................. 347/256 |
| 5,341,158 | 8/1994 | Appel et al. . |
| 5,371,526 | 12/1994 | Appel et al. .................................. 347/239 |
| 5,402,436 | 3/1995 | Paoli .................................. 347/238 |

*Primary Examiner*—Benjamin R. Fuller
*Assistant Examiner*—Thinh Nguyen
*Attorney, Agent, or Firm*—Oliff & Berridge

[57] ABSTRACT

In a raster scanning system (ROS) of a multi-station xerographic printing device, the image height of each of the images formed from a plurality of clustered laser beams having dissimilar wavelengths is changed so that the image heights approximate each other. This is accomplished by passing one or more of the light beams through light transmissive plates having a predetermined thickness and index of refraction. The light transmissive plates can be optical filters that also one used to separate the clustered light beams based upon their wavelength and/or polarization.

25 Claims, 4 Drawing Sheets

METHOD AND APPARATUS FOR REDUCING DIFFERENCES IN IMAGE HEIGHTS OF IMAGES GENERATED BY PLURAL LIGHT BEAMS HAVING DISSIMILAR WAVELENGTHS

FIELD OF THE INVENTION

The present invention relates to xerographic printing utilizing a shared raster output scanner, and in particular, to such printing devices that reduced differences in image heights of the images generated by plural beams separated by wavelength.

BACKGROUND OF THE INVENTION

Flying spot scanners, often referred to as raster output scanners (ROS), conventionally have a reflective multi-faceted polygon mirror that is rotated about its central axis to repeatedly sweep one or more intensity modulated beams of light across a photosensitive recording medium in a line scanning direction (also known as the fast-scan direction) while the recording medium is being advanced in an orthogonal, or process, direction (also known as the slow-scan direction) such that the beams scan the recording medium in accordance with a raster scanning pattern. Digital printing is performed by serially intensity modulating each of the beams in accordance with a binary sample string, whereby the recording medium is exposed to the image represented by the samples as it is being scanned. Printers that sweep several beams simultaneously are referred to as multi-beam printers. Both ROS and multi-beam printer techniques are illustrated in U.S. Pat. No. 4,474,422 to Kitamura, the disclosure of which is incorporated herein by reference.

In the Kitamura patent, multiple lasers are arranged diagonally (see FIG. 10b of the Kitamura patent) to sweep multiple beams across a single photoreceptor. The beams are also displaced from each other in the cross-scan direction so that multiple lines can be scanned simultaneously across the photoreceptor. An object of the Kitamura patent is to reduce variations in pitch by spacing individual lasers within the laser array closely in a compact structure.

High speed process color and multi-highlight color xerographic image output terminals require multiple independently addressable raster lines to be printed simultaneously at separate locations. This is called multi-station printing.

Conventional architectures from multi-station process color printers use a plurality of separate ROSs, usually four independent ROSs, as illustrated in U.S. Pat. Nos. 4,847,642 and 4,903,067 to Murayama et al., the disclosures of which are incorporated herein by reference. Problems with these systems include the high cost of providing multiple ROSs, the high cost of producing nearly identical multiple ROSs and the difficulty of registering system colors.

U.S. Pat. No. 5,243,359 to Fisli, the disclosure of which is incorporated herein by reference in its entirety, discloses a ROS system suitable for deflecting multiple laser beams in a multi-station printer. In the Fisli patent, the rotating polygon mirror simultaneously deflects a plurality of clustered, dissimilar wavelength laser beams having their largest divergence angles parallel to one another, that are subsequently separated by a plurality of optical filters and directed onto their associated photoreceptors. Similarly dimensioned spots are obtained on each photoreceptor by establishing similar path lengths for each beam. This is facilitated by locating all lasers in one integral unit. The laser diodes are arranged in a line in a cross-scan direction, i.e., parallel to the axis of rotation of the polygon mirror.

Commonly assigned U.S. patent application Ser. No. 07/948,531, to Thomas L. Paoli, the disclosure of which is incorporated herein by reference in its entirety, discloses a ROS system in which the rotating polygon mirror simultaneously deflects a plurality of orthogonally polarized and dissimilar wavelength laser beams having their largest divergence angles parallel to one another. The deflected laser beams are subsequently separated by a polarized beam separator and by a plurality of dichroic beam separators and directed onto their associated photoreceptors. Similarly, the dimensions of the spots formed on each photoreceptor are controlled by establishing similar path lengths for each beam. This is facilitated by locating all lasers in one integral unit. The laser diodes are arranged in a line in a cross-scan direction and must be fabricated such that they are packed closely together in a direction parallel to the polygon mirror rotation axis to minimize beam characteristic deviations such as spot size, energy uniformity, bow and linearity. That is, the laser diodes are kept as close together as possible in the cross-scan direction so that the light beams strike as nearly the same portion of the polygon mirror as possible.

Commonly assigned U.S. Pat. No. 5,341,158 entitled "A Raster Output Scanner for a Multi-Station Xerographic Printing System Having Laser Diodes Arranged in a Line Parallel to the Fast Scan Direction", to James J. Appel et al., the disclosure of which is incorporated herein by reference in its entirety, discloses a ROS architecture in which the laser diodes are positioned along a line that is parallel to the fast scan direction of the ROS (perpendicular to the rotation axis of the polygon mirror) and are tangentially offset in the fast scan direction.

Commonly assigned, U.S. patent application Ser. No. 08/156,219 entitled "Offset Mounting of Nonmonolithic Multiwavelength Lasers" to Kovacs et al., the disclosure of which is incorporated herein by reference in its entirety, discloses a ROS architecture in which the laser diodes, which produce laser beams of different wavelengths, are axially displaced from one another. The laser producing the beam having the shortest wavelength is located closest to an Fθ scan lens and the laser producing the beam having the longest wavelength is located farthest from the Fθ lens. Because the focal length of the Fθ lens is dependent on the wavelength of the transmitted laser beam, axially offsetting the laser sources results in the laser beams being focused is substantially the same plane. In U.S. patent application Ser. No. 08/156,219, as well as the above-referenced patents and patent applications that direct multiple beams separated by wavelength to separate photoreceptors, the beams are separated by wavelength or wavelength and polarization by beam separators. However, none of the above-referenced patents or patent applications recognize or solve the problem that the optics and optical separators through which the beams pass have a different index of refraction for beams having dissimilar wavelengths. This results in the images being fixed on the separate photoreceptors having differing image heights in the tangential direction. This problem causes improper registration of the images on the imaging medium.

SUMMARY OF THE INVENTION

It is therefore an object of embodiments of this invention to provide a method and apparatus for equalizing an image height of each of a plurality of images produced on image receiving surfaces by light beams having dissimilar wavelengths.

It is a further object of embodiments of this invention to provide a multiple light beam ROS system that equalizes an image height of each of a plurality of images produced on a plurality of image receiving surfaces by the light beams, the beams having dissimilar wavelengths.

In order to realize this and other objects, and to overcome the shortcomings set forth above, a raster output scanner for a printing device having a plurality of light beams of dissimilar wavelengths includes a light transmissive plate positioned in the path of at least one of the light beams between an image receiving surface and a deflecting device (such as, for example, a polygon scanner) that simultaneously deflects the light beams. The light transmissive plate is selected to reduce a difference in the image height of the images formed by the plurality of light beams. Preferably, the light transmissive plate equalizes the image height of the plurality of light beams. The thickness and index of refraction of the light transmissive plate is selected to perform this reduction, or equalization, function.

In a preferred embodiment, an image height compensating light transmissive plate is placed in the path of each of the light beams except the light beam having the shortest wavelength. The thickness and index of refraction of each light transmissive plate is selected (based on the wavelength of the light beam that passes therethrough) so that the image height of the image formed by each light beam approximates the image height of the image formed by the light beam having the shortest wavelength (the uncompensated light beam).

A typical raster output scanner arrangement includes a plurality of light sources (e.g., laser diodes) that produce a plurality of light beams having dissimilar wavelengths, a rotating polygon scanner that simultaneously deflects the plurality of light beams onto a first optical path, an optical separator for differentially passing and reflecting the light beams onto disparate optical paths, which are directed toward a plurality of image receiving locations (e.g., on one or more photoreceptors). Each of the light beams scans across its respective image receiving location in a scanning direction to form an image at each of the image receiving locations. Each image has an image height measured along the scanning direction. A light transmissive plate is positioned in at least one of the disparate optical paths and reduces a difference between (preferably equalizes) the image height of each of the images.

According to one preferred embodiment, the light source produces pairs of light beams, wherein the light beams of each pair have similar wavelengths that are dissimilar from the wavelengths of other pairs of light beams. (For example, a polarizing filter could be placed in the path of one light beam of each pair, or the light sources of each pair of light beams could be rotated so that they generate light beams having different polorization orientations.) With this arrangement, where multiple pairs of light beams are generated, each at different wavelengths, at least one of the pairs of light beams is passed through a light transmissive plate that is designed to cause the image height of the resulting image to be close to (preferably equal to) the image height of images formed by light beams having a different wavelength. With this embodiment, the printing device usually includes a device (e.g., an optical filter) that selectively passes and reflects light beams based on their wavelength. The thickness and index or refraction of the material comprising the optical filter can be selected in accordance with the invention so that the image height of the image formed by the light beams that passes through the optical filter is adjusted to compensate for differences in wavelengths. By differentially polarizing pairs of light beams, the number of different wavelengths that are produced by the light source is reduced by a factor of two.

BRIEF DESCRIPTION OF THE DRAWINGS

The above and further objects and advantages of the present invention will become clear from the following description of preferred embodiments taken in conjunction with the following drawings, in which like reference numerals refer to like elements, and wherein.

DETAILED DESCRIPTION OF PREFERRED EMBODIMENTS

While this invention is described in detail herein, with specific reference to certain illustrated embodiments, it is to be understood that there is no intent to be limited to those embodiments. On the contrary, the aim is to cover all modifications, alternatives and equivalents falling within the spirit and scope of the invention as defined by the claims. For example, the invention is applicable to all types of printing devices that use light beams having different wavelengths to form images. Such printing devices include facsimile machines, copiers, printers, etc. Although the illustrated printing devices use four light beams, the invention is applicable to any device where one light beam has a wavelength that is different from the wavelength of another beam. Thus, the invention is applicable to printing devices having two or more light beams. The illustrated embodiments direct each light beam to separate imaging surfaces that are separate photoconductive drums. However, the invention also is applicable to printing devices that use a single imaging surface to receive multiple scanned light beams. For example, a single photoreceptor belt that is sensitive to different wavelengths could receive each of the light beams. Typically in such a system the light beams would be directed to different locations on the single imaging surface, although it is possible to direct each light beam to the same location. The main feature is that each beam forms its own distinct image, which needs to properly match with the images formed by the other light beams.

Figure 1:
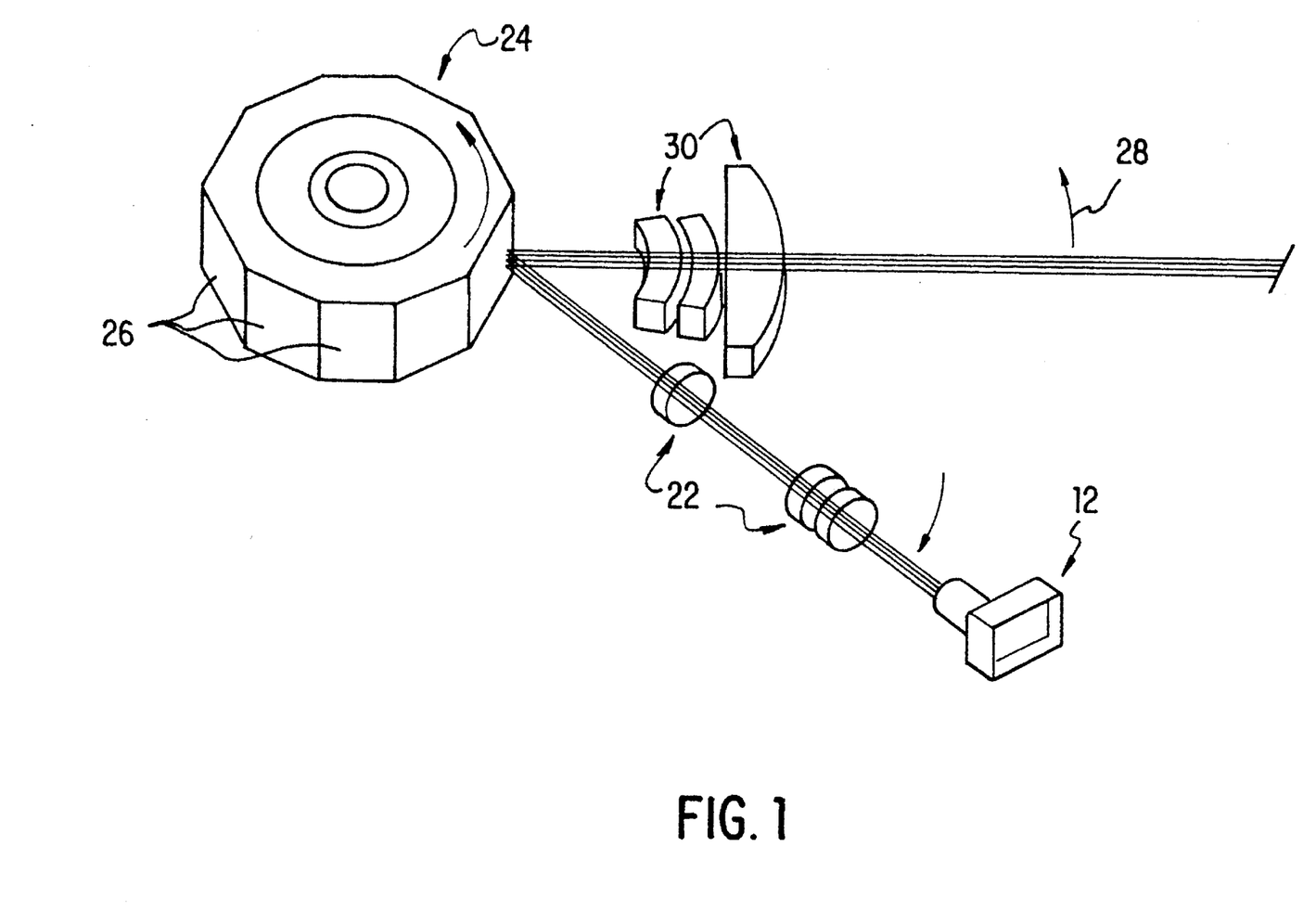
FIG. 1 is a simplified, schematic view of a raster output scanner (ROS) system that is usable with the present invention.

In FIG. 1, device 12 outputs four different wavelength laser beams 14, 16, 18 and 20. For purposes of clarity, only the chief rays of each beam are shown. The invention also is applicable to arrangements where a distinct laser source is provided for each light beam, each laser source being located at a different location. Device 12 effectively provides a substantially common spatial origin for each beam as opposed to an arrangement where each beam is provided at a separate location. The four laser beams 14, 16, 18 and 20 generated by device 12 are input to a conventional beam input optical system 22, which directs the beams onto an optical path such that they illuminate a rotating polygon mirror 24 having a plurality of facets 26. As the polygon mirror rotates, the facets cause the reflected beams to scan repeatedly in the direction indicated by arrow 28. The deflected laser beams are input to a single set of imaging and correction optics (i.e., an Fθ scan lens) 30, which focuses the beams and corrects for errors such as polygon angle error and wobble.

Fθ scan lenses, such as lens 30 are well known. The present inventor has discovered that an Fθ scan lens that is used in printing devices that print with one or more light beams at a single wavelength (hereinafter referred to as a monochrome Fθ scan lens) introduces problems when used with plural light beams having different wavelengths. In particular, because the refractive index of a monochrome Fθ lens differs for different wavelengths of light, the direction that the light beams exit the monochrome Fθ lens differs slightly for different wavelength light beams even though these light beams entered the monochrome Fθ lens travelling in the same direction. This causes the images formed by each of the different wavelength light beams to have different image heights (which will be described in more detail below). The difference in image height is related to the difference in wavelength and the position along the scan line (i.e., the difference in image height is larger at ends of the scan line as compared to the center of the scan line). While it may be possible to design special "corrected" Fθ scan lens that do not cause the image height difference problem when used with multiple wavelengths, the cost of a corrected Fθ lens would be many times that of a monochrome Fθ lens. This cost would increase further as the number of different wavelengths increases.

As will be detailed below, the present invention enables a monochrome Fθ lens to be used with light beams having different wavelengths and provides structure that compensates for the differences in image heights that would otherwise be produced.

Figure 2:
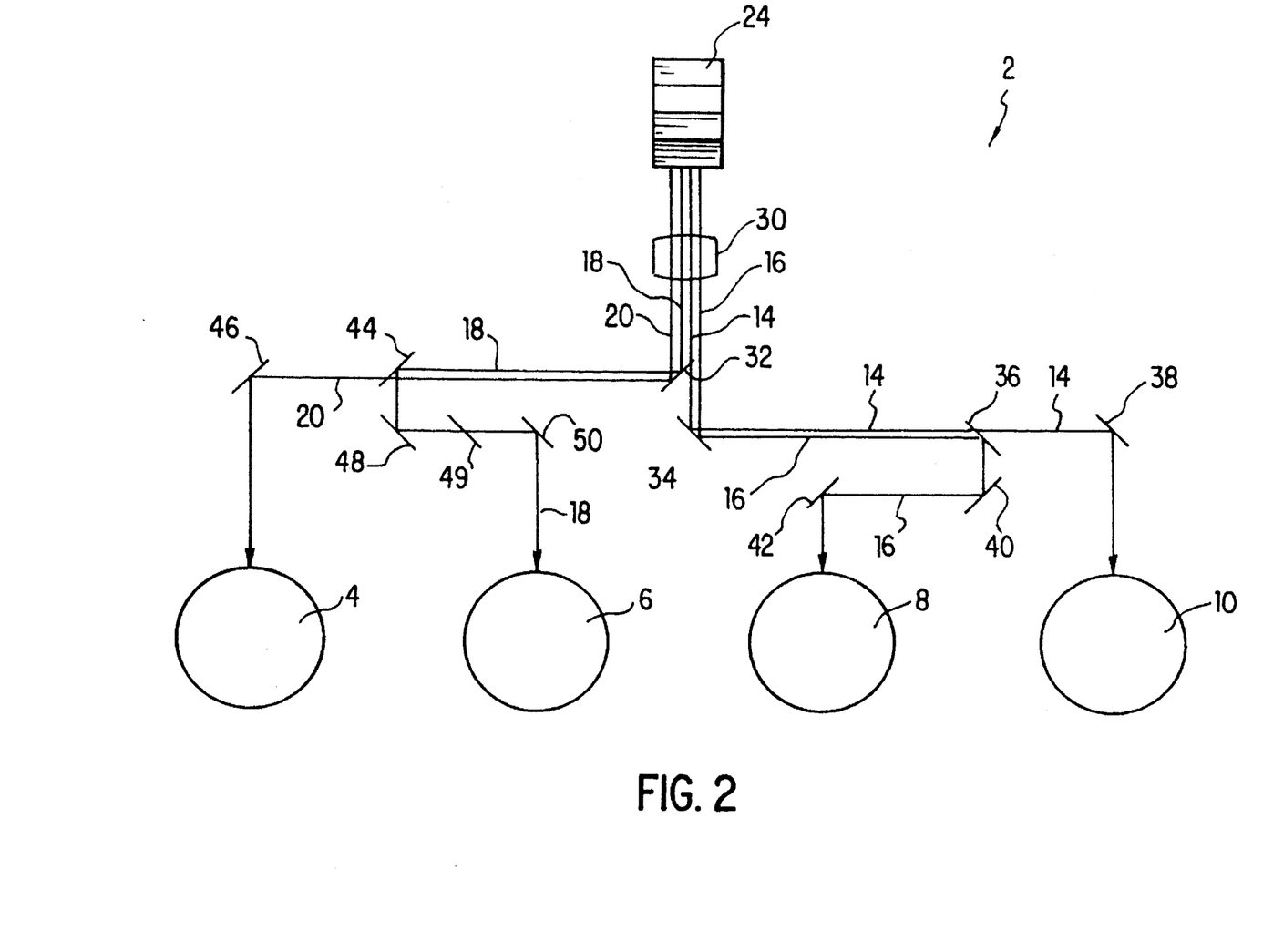
FIG. 2 is a perspective, schematic view illustrating the orientation of the laser sources, beam separating optics and the rotating polygon mirror in FIG. 1.

FIG. 2 shows a simplified, schematic view of a multistation printing device 2 that uses the laser beams 14, 16, 18 and 20 reflected from rotating polygon 24. The light beams pass through correction and imaging optics 30 (e.g., a monochrome Fθ lens). The dissimilar wavelength laser beams are synchronously scanned across four rotating image receiving surfaces 4, 6, 8 and 10 to form separate images on each surface 4, 6, 8 and 10. (Ultimately, the images are superposed to form a single, composite image.) In this example, the wavelengths of beams 14, 16, 18 and 20 are 695 nm, 645 nm, 755 nm, and 825 nm respectively. The image receiving surfaces 4, 6, 8 and 10 may be photoreceptors. As the multi-station printing device 2 may be used for full color reproduction, each laser beam may produce a latent image on its associated photoreceptor that corresponds to a system color (e.g., magenta, yellow, cyan and black) that will be transferred onto a recording medium (not shown).

In FIG. 2, the deflected laser beams have substantially parallel optical axes and may be tightly clustered. The four laser beams from the imaging correction optics 30 are input to a first optical filter 32. The first optical filter can be a dichroic mirror (e.g., a color-selective beam splitter) comprised of a wavelength selective, multi-layer film. Because of the characteristics of the first optical filter 32, laser beams 14 and 16 (having the shorter wavelengths) are passed while laser beams 18 and 20 are reflected.

The passed laser beams 14 and 16 reflect off a first mirror 34 onto a second optical filter 36. The second optical filter 36 is similar to the first optical filter 32 in that it reflects one beam, while passing the other beam. The second optical filter 36 passes laser beam 14 while it reflects laser beam 16 due to the different wavelengths of the beams. The passed laser beam 14 is reflected from a second mirror 38 onto the image receiving surface 10, while the reflected laser beam 16 is reflected from a third mirror 40 and a fourth mirror 42 onto image receiving surface 8.

The laser beams reflected from the first optical filter 32, i.e., laser beams 18 and 20, are directed to a third optical filter 44. The third optical filter 44 passes laser beam 20 while it reflects laser beam 18. The passed laser beam 20 reflects from a fifth mirror 46 onto image receiving surface 4 while the reflected laser beam 18 reflects from a sixth mirror 48 through light transmissive plate 49 and is reflected from a seventh mirror 50 onto image receiving surface 6. Laser beams 14, 16, 18 and 20 are scanned across image receiving surfaces 4, 6, 8 and 10 in a scanning direction, the scanning direction being perpendicular to the axis of rotation of polygon 24 (and parallel to the rotation axis of each photoreceptor) to form images on the image receiving surfaces having an image height measured in the scanning direction.

In accordance with the present invention, the optical filters 36 and 44 and the light transmissive plate 49 are designed to equalize the image height of the images produced by beams 14, 18 and 20 with the image height of the image produced by beam 16, beam 16 having the shortest wavelength, as will be further described below. Alternatively, light conductive plates may be used between optical filter 44 and image receiving surface 4 and between optical filter 36 and image receiving surface 10 to equalize the image height of images produced on image receiving surfaces 4 and 10 with the image height of the image produced on image receiving surface 8.

Although the term "equalize" is used herein (and of course it is preferable to equalize the image heights of all images), even when using the present invention, it may be difficult (i.e., too expensive or to timeconsuming) to design plates that exactly equalize the image heights. Accordingly, the invention includes the use of light transmissive plates that minimize or reduce the differences in image heights between the images formed by different wavelength light beams.

Figure 3:
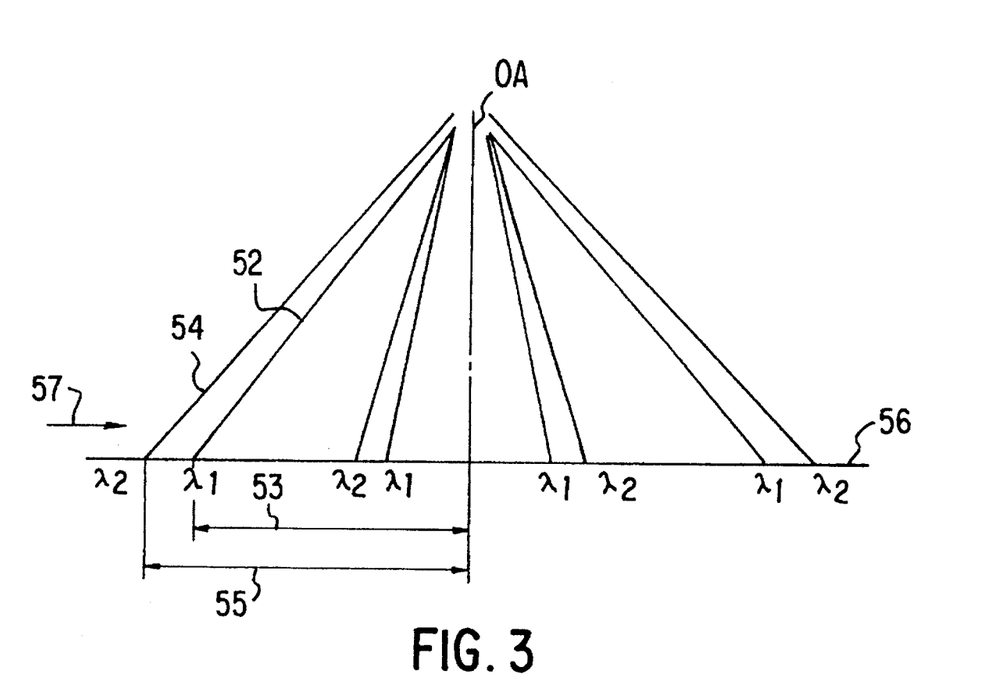
FIG. 3 illustrates unequal image heights that are created in a conventional system by two light beams having dissimilar wavelengths.

FIG. 3 shows how unequal image heights can be created in a conventional system by two light beams having dissimilar wavelengths. In the conventional system shown in FIG. 3, light beam 52, having wavelength λ1 and light beam 54, having wavelength λ2 (λ2>λ1) are projected through optics similar to correction optics 30 shown in FIG. 2 onto image receiving surface 56, which may be a photoreceptor. The beams are scanned across the image receiving surface 56 in a direction shown by arrow 57 to form images on the image receiving surface 56. However, the beams 52 and 54, when passing through the imaging and correction optics, will be refracted differently from one another because the imaging and correction optics, have different indexes of refraction for beams having different wavelengths. Thus, as shown in FIG. 3, even though they initially were aimed at a common point, beams 52 and 54, when scanned in direction 57, will produce images having different image heights 53 and 55 on the image receiving surface 56. Moreover, the difference between the image heights increases, and thus is more pronounced, with increasing distance from the optical axis OA. Accordingly, the present invention provides means for reducing the difference between the image height of each of the images (preferably equalizing the image heights) produced by the dissimilar wavelength light beams, as will be further described below.

Figure 4:
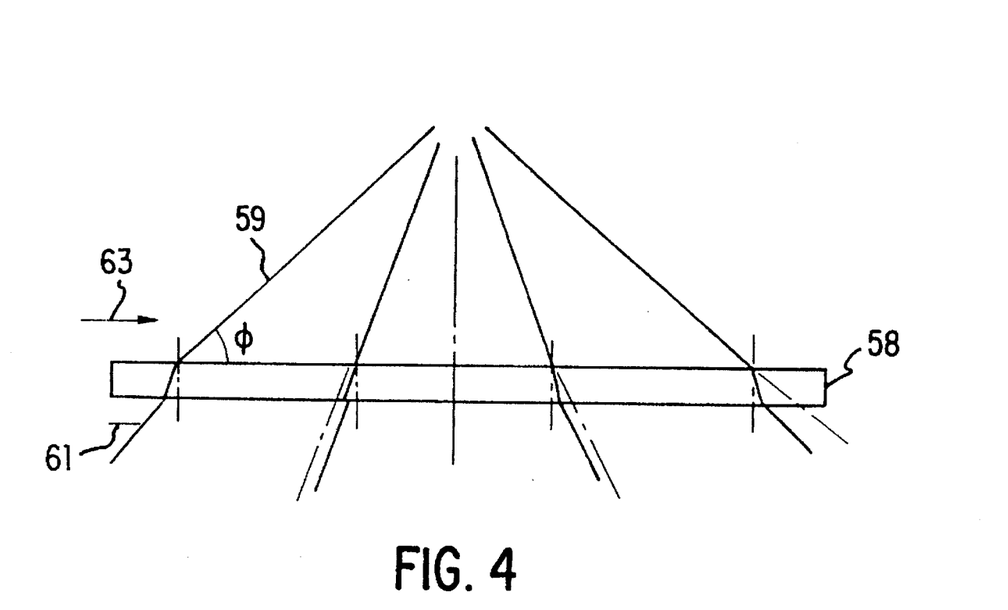
FIG. 4 shows a light transmissive plate for adjusting the image height of an image produced by a light beam in accordance with the invention.

FIG. 4 shows a light transmissive plate 58 for changing (in this example, reducing) an image height of an image produced by a beam having a predetermined wavelength. As shown in FIG. 4, beam 59 is scanned in direction 63 to create an image on an image receiving surface. The light transmissive plate 58 will reduce the image height of an image produced by scanning beam 59 in direction 63 by refracting the beam as it passes through the light conductive plate 58. The image height will be reduced by a distance 61, as shown in FIG. 4. As illustrated by FIG. 4, the reduction in image height is larger at the ends of the scan line (i.e., farther from the optical axis) than at the center of the scan line (i.e., at the optical axis) due to the difference in the angle of incidence φ where the beam passes through light transmissive plate 58. Conveniently, the amount of correction required in each light beam increases as the distance from the optical axis increases, as detailed above. Accordingly, by placing light transmissive plate 58 in the path of the light beam having the larger wavelength (e.g., beam 54 in FIG. 3), the image height of its image can be reduced to approximate the image height of the image formed by the beam having the shorter wavelength (e.g., beam 52).

The change in the image height caused by plate 58 is affected by various factors including the thickness of the light transmissive plate 58, the index of refraction of the light transmissive plate 58 at the specific wavelength of the beam and the angle of incidence of the beam at the specific field position φ. The change in the image height D may be controlled by designing the plate 58 in accordance with the following formula (for low angles of incidence φ):

$$D = t \sin \phi (n-1)/n$$

where, t=light conductive plate thickness, n=index of refraction of plate at specific wavelength and φ=angle of incidence at specific field position. Thus, by providing light transmissive plates having the proper thickness and index of refraction in the paths of the light beams, the image heights of the images produced on the different image receiving surfaces are adjusted to approximate each other.

It is possible to place an image height compensating light transmissive plate in the path of each light beam (when the plural light beams have distinct wavelengths), so that the image heights of the resulting images are substantially the same. Usually, however, in order to reduce the number of plates, one of the light beams is left uncompensated (for example, the light beam having the shortest wavelength the Fθ lens was designed for), while light transmissive plates are included in the paths of the other light beams, these plates being designed to change the image height of the resulting image so that it approximates the image height of the image formed by the uncompensated (but correct)light beam.

Even more preferably, light transmissive optical components already existing in the system can be modified (e.g., by having their thickness and refractive index selected) to perform the image height correction function described above. As shown in FIG. 2, optical filters 36 and 44 may be designed to cause the images formed by the light beams that pass therethrough (i.e., light beams 14 and 20) to have image heights that approximate each other and that approximate the image height of the image formed by light beam 16. It should be noted that while it has been suggested to include optical filters in printing devices to separate light beams by wavelength (see, for example, U.S. Pat. No. 5,243,359), it has not been suggested to select the thickness and refractive index of the optical filters so that they reduce (preferably minimize) differences between the image heights of images formed by different wavelength light beams.

Figure 5:
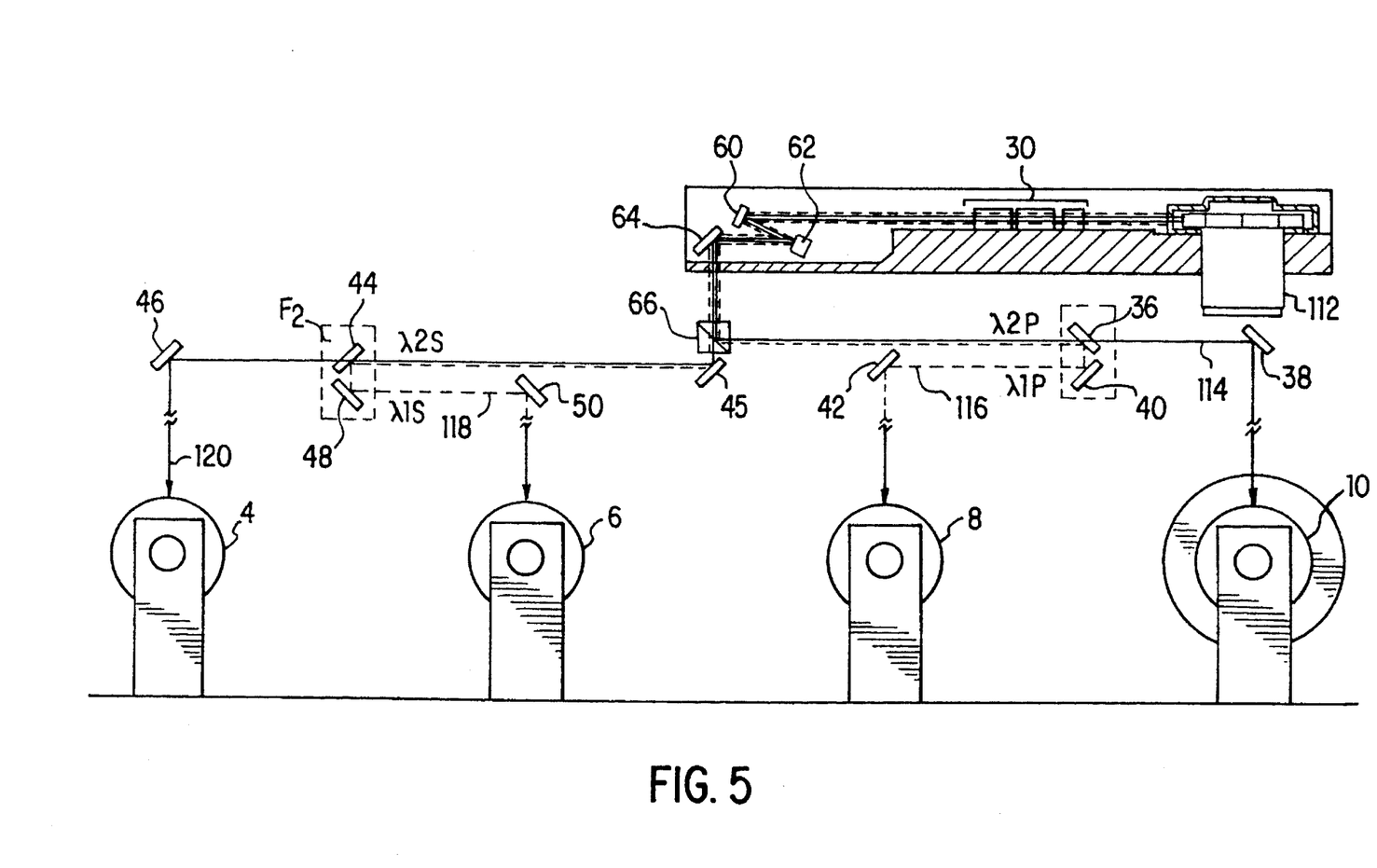
FIG. 5 is a simplified, schematic view of a raster output scanner system according to a second preferred embodiment of the present invention.

FIG. 5 shows a second embodiment of the present invention, which produces two pairs of laser beams, each pair of laser beams having dissimilar wavelengths from the other pair of laser beams. The polarization of the light beams within each pair is rotated to be different from the polarization of the light of the other pair by, for example, 90° so that the two beams within each pair can be distinguished and thus separated from each other. The beams can then be separated by post-polygon optics in accordance with both wavelength and polarization characteristics of the light beams. This configuration produces a raster output scanner with four beams that only requires the beams having two dissimilar wavelengths. Device 112 scans four laser beams 114, 116, 118 and 120. The beams 116 and 118 comprise a first pair of beams having a first wavelength (λ1) and the beams 114 and 120 comprise a second pair of beams having a second wavelength (λ2) longer than λ1. One beam within each pair of beams has a different polarization from the other beam within each pair of beams (beam 114 has a different polarization from beam 120, and beam 116 has a different polarization from beam 118).

The beams 114, 116, 118 and 120 are reflected by mirror 60 onto motion compensation optics 62, which corrects for polygon wobble, for example. The beams 114, 116, 118 and 120 are then reflected onto mirror 64 and to polarized beam separator 66. Polarized beam separator 66 separates the beams by their polarization by reflecting beams 114 and 116, which have a first polarization (P), and passing beams 118 and 120, which have a second polarization (S). The polarized beam separator 66 can be, for example, a prism or a device having a polarization selective multiple layer film. Since the system simultaneously forms, sweeps and deflects each light beam and since each beam is from substantially the same spatial location and has parallel optical axes, similarly dimensioned beams are input to the polarized beam separator 66. Thus, the problem of maintaining equal optical path lengths for each of the beams reduces to the much simpler problem of maintaining substantially equal optical path lengths from polarized beam separator 66 to the image receiving surfaces 4, 6, 8, and 10. Substantially equal path lengths are set by adjusting the optical path lengths after the polarized beam separator 66. This may be accomplished by properly positioning mirrors 38, 40, 42, 45, 46, 48 and 50. It is understood that other arrangements are possible depending on the number of beams to be separated and the sequence of beam separation (i.e., by wavelength followed by polarization, or vise versa). The beams 114, 116, 118 and 120 are directed to the image receiving surfaces 4, 6, 8 and 10 by the mirrors and optical filters as described above in conjunction with FIG. 2.

Similar to the embodiment described in connection with FIG. 2, the embodiment shown in FIG. 5 changes the image heights of the images produced on each of the image receiving surfaces 4, 6, 8 and 10 so that they approximate each other. Because beams 116 and 118 have an equal wavelength, they will produce images having an equal image height on image receiving surfaces 6 and 8. However, because beams 114 and 120 both have a separate wavelength longer than the wavelength of the beams 116 and 118, the images produced on image receiving surfaces 4 and 10, if not corrected, would have a different image height from the images produced on image receiving surfaces 6 and 8.

Accordingly, this embodiment of the present invention reduces the difference between the image heights of the images produced on image receiving surfaces 4 and 10 and the image heights of the images produced on image receiving surfaces 6 and 8, preferably equalizing the image heights. This is done, as detailed above, by properly setting the thickness and the index of refraction of the optical filters (e.g., glass plates) 36 and 44 to reduce the height of the images produced on each of the image receiving surfaces 4 and 10.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A raster output scanner for a printing device having a plurality of light beams of dissimilar wavelengths, comprising:

deflecting means for simultaneously deflecting the light beams, after deflection, the light beams travelling along disparate optical paths and being scanned across respective image receiving locations to form respective images at said respective image receiving locations, each of said respective images having an image height measured as a distance a respective one of the light beams travels at the respective image receiving locations along a scanning direction; and a light transmissive plate positioned in at least one of the disparate optical paths, said light transmissive plate having a thickness and an index of refraction selected so as to change the image height of the image formed by the light beam passing through said light transmissive plate so that said image height approximates an image height of an image formed by another of said light beams.

2. The raster output scanner of claim 1, wherein the plurality of light beams are emitted from a plurality of laser diodes, each laser diode emitting a light beam having a wavelength dissimilar from a wavelength of the light beams output by other ones of the laser diodes.

3. The raster output scanner of claim 1, wherein the deflecting means is a polygon mirror mounted for rotation about a central axis.

4. The raster output scanner of claim 1, wherein light transmissive plates are positioned in the disparate optical paths of each of the light beams except for a light beam having a shortest wavelength.

5. The raster output scanner of claim 1, wherein the respective image receiving locations are disposed on a plurality of photoreceptors.

6. The raster output scanner of claim 1, further comprising:

optical separator means, between said deflecting means and said respective image receiving locations, for differentially passing and reflecting the light beams onto the disparate optical paths.

7. The raster output scanner of claim 1, wherein the plurality of light beams comprises four light beams of dissimilar wavelengths and further comprising a respective light transmissive plate positioned in the disparate optical paths of each of the light beams except for a light beam having a shortest wavelength.

8. The raster output scanner of claim 1, wherein the light transmissive plate comprises an optical filter that selectively passes and reflects the light beams based on a characteristic of said light beams, said optical filter changing the image height of the passed beam.

9. A raster output scanner for a four station printing device, comprising:

a light source emitting first, second, third and fourth light beams of different wavelengths;

a polygon mirror mounted for rotation about a central axis, the polygon mirror simultaneously deflecting the light beams onto a first optical path;

a first optical separator disposed on the first optical path, the first optical separator directing the first light beam and the second light beam onto a disparate second optical path and directing the third light beam and the fourth light beam onto a disparate third optical path;

a second optical separator disposed on the second optical path directing the first light beam onto a disparate fourth optical path and directing the second light beam onto a fifth disparate optical path;

a third optical separator disposed on the third optical path directing the third light beam onto a disparate sixth optical path and directing the fourth light beam onto a disparate seventh optical path;

first, second, third and fourth image receiving locations receiving the first, second, third and fourth light beams, respectively, the light beams scanning across each of the first, second, third and fourth image receiving locations in a scanning direction to form an image at each of the image receiving locations, each image having an image height measured as a distance a respective one of the light beams travels at respective image receiving locations along the scanning direction; and a light transmissive plate positioned in at least one of the optical paths, said light transmissive plate having a thickness and an index of refraction selected so as to change the image height of the image passing therethrough so that said image height approximates the image height of an image formed by another of said light beams.

10. The raster output scanner of claim 9, wherein the plurality of light beams are emitted from a plurality of laser diodes, each laser diode emitting a light beam having a wavelength dissimilar from a wavelength of the light beams output by other ones of the laser diodes.

11. The raster output scanner of claim 9, wherein a separate light transmissive plate is positioned in the disparate optical paths of each of the first, second, and third light beams so that the image heights of the images formed by the first, second, and third light beams approximates the image height of the image formed by the fourth light beam.

12. The raster output scanner of claim 9, wherein the first, second, third and fourth image receiving locations comprise first, second, third and fourth photoreceptors, respectively.

13. The raster output scanner of claim 9, wherein said light transmissive plate is one of said second and third optical separators.

14. A raster output scanner for a printing device, comprising:

a light source which emits a plurality of pairs of light beams, the light beams within each pair of light beams having similar wavelengths, dissimilar from other pairs;

polarization means for varying a polarization of one light beam within each pair of light beams, the polarization means disposed in an optical path of the light beams;

deflecting means for simultaneously deflecting the light beams onto a first optical path;

first optical separator means for differentially passing and reflecting the light beams onto first disparate optical paths according to the polarization of the light beams;

a plurality of image receiving locations, at least one of the light beams scanning across each of the image receiving locations in a scanning direction to form an image at each of the image receiving locations, each image having an image height measured as a distance a respective one of the light beams travels at a respective image receiving location in the scanning direction; and a light transmissive plate positioned in at least one of the first disparate optical paths, said light transmissive plate having a thickness and an index of refraction selected so as to change the image height of the image formed by the light beam passing therethrough so that said image height approximates the image height of an image formed by another of said light beams.

15. The raster output scanner according to claim 14, further comprising second optical separator means for differentially passing and reflecting the light beams within each pair of light beams onto second disparate optical paths according to a wavelength of the light beams within each pair of light beams.

16. The raster output scanner according to claim 14, wherein the plurality of light beams are emitted from a plurality of pairs of laser diodes, each pair of laser diodes emitting a light beam having a wavelength different from a wavelength of the light beams output by other ones of the pairs of laser diodes.

17. The raster output scanner of claim 14, wherein the deflecting means is a polygon mirror mounted for rotation about a central axis.

18. The raster output scanner of claim 14, wherein the plurality of image receiving locations are disposed on a plurality of photoreceptors.

19. The raster output scanner of claim 14, wherein the plurality of pairs of light beams comprise four light beams, and the light transmissive plate is disposed in a path of at least one of the light beams.

20. The raster output scanner of claim 19, wherein said light transmissive plate is an optical filter that selectively passes and reflects said light beams based on a wavelength of said light beams.

21. The raster output scanner of claim 14, wherein the plurality of pairs of light beams comprise four light beams and a separate light transmissive plate is disposed in a path of at least three of the four light beams.

22. A method of producing images with a raster output scanner for a printing device that forms the images at a plurality of image receiving locations, the raster output scanner having a plurality of light beams of different wavelengths, comprising the steps of:

differentially passing and reflecting the light beams onto disparate optical paths;

forming the images at each of the plurality of image receiving locations by scanning at least one of the light beams across each of the image receiving locations in a scanning direction, each of the images having an image height measured as a distance at least one of the light beams travels at respective image receiving location along the scanning direction; and prior to forming said images, passing at least one of the light beams through a light transmissive plate having a thickness and an index of refraction selected so as to change the image height formed by the light beam passing therethrough so that said image height approximates an image height of an image formed by another of said light beams.

23. The method of claim 22, wherein said light transmissive plate is an optical filter that selectively passes and reflects said light beams based on a characteristic of said light beams, said light transmissive plate only changing the image height of the image formed by the light beam passing therethrough.

24. A method of producing images with a raster output scanner for a printing device having a plurality of image receiving locations, comprising the steps of:

emitting a plurality of pairs of light beams from a light source, each pair of light beams having similar wavelengths, dissimilar from the other pairs;

varying a polarization of one light beam within each pair of light beams;

simultaneously deflecting the light beams onto a first optical path;

differentially passing and reflecting each pair of light beams onto first disparate optical paths according to the polarization of the light beams;

forming the images at each of the plurality of image receiving locations by scanning at least one of the light beams across each of the image receiving locations in a scanning direction, each of the images having an image height measured as a distance at least one of the light beams travels along the scanning direction at a respective image receiving location;

passing each of the light beams in at least one of the pairs of light beams through light transmissive plates, the light transmissive plates having a thickness and index of refraction selected so as to change the image height formed by the at least one pair of light beams passing through the light transmissive plates so that said image heights of said at least one pair of light beams approximates the image heights of images formed by another of said pairs of light beams.

25. The method of claim 24, further comprising the step of differentially passing and reflecting the light beams within each pair of light beams onto second disparate optical paths according to a wavelength of the light beams.

* * * * *